US008341777B2

(12) United States Patent
Hensley et al.

(10) Patent No.: US 8,341,777 B2
(45) Date of Patent: Jan. 1, 2013

(54) HOSPITAL BED HAVING CASTER BRAKING ALARM

(75) Inventors: David W. Hensley, Milan, IN (US); Jean-Bernard Duvert, Auray (FR); Sebastien Gemeline, Ploemuer (FR); Patrick Weizman, Liberty Township, OH (US); Gary S. Siegle, Cincinnati, OH (US); Olivier Barbu, Redon (FR); Le Boeuf Guenael, Sarzeau (FR)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 13/362,780

(22) Filed: Jan. 31, 2012

(65) Prior Publication Data

US 2012/0124743 A1 May 24, 2012

Related U.S. Application Data

(60) Division of application No. 13/021,823, filed on Feb. 7, 2011, now Pat. No. 8,122,535, which is a continuation of application No. 12/630,153, filed on Dec. 3, 2009, now Pat. No. 7,882,580, which is a continuation of application No. 10/557,524, filed as application No. PCT/US2004/016260 on May 20, 2004, now Pat. No. 7,644,457.

(60) Provisional application No. 60/472,260, filed on May 21, 2003.

(51) Int. Cl.
*A61G 7/00* (2006.01)
*B60B 33/00* (2006.01)

(52) U.S. Cl. .................... 5/424; 5/600; 5/86.1; 16/18 R; 16/35 R

(58) Field of Classification Search ............. 5/600, 86.1, 5/424, 510; 16/18 R, 35 R
See application file for complete search history.

(56) References Cited

U.S. PATENT DOCUMENTS

| | | | |
|---|---|---|---|
| 2,096,229 | A | 10/1937 | Dudley |
| 2,572,548 | A | 10/1951 | Weisz et al. |
| 2,659,927 | A | 11/1953 | Simpson |
| 2,738,539 | A | 3/1956 | Schultz |
| 3,304,116 | A | 2/1967 | Stryker |
| 3,452,386 | A | 7/1969 | Carlson |
| 3,478,381 | A | 11/1969 | Schultz |
| 3,479,681 | A | 11/1969 | Maslow |

(Continued)

FOREIGN PATENT DOCUMENTS

CH 570 802 12/1975

(Continued)

OTHER PUBLICATIONS

European Search Report for EP 10 00 0577 dated Feb. 2, 2011, 7 pages.

*Primary Examiner* — Michael Trettel
(74) *Attorney, Agent, or Firm* — Barnes & Thornburg LLP

(57) ABSTRACT

A patient support is connectable to an external power source. The patient support includes a bedframe supported on a floor, a plurality of wheels coupled to the bedframe, and a brake configured to prevent the bed from moving on the floor. The brake is moveable between a braked position and an unbraked position. The patient support also includes a controller configured to activate an alarm when the brake is moved to the unbraked position when the bed is connected to the external power source.

19 Claims, 17 Drawing Sheets

U.S. PATENT DOCUMENTS

| | | | |
|---|---|---|---|
| 3,487,495 | A | 1/1970 | Schultz |
| 3,493,085 | A | 2/1970 | Libhart |
| 3,635,491 | A | 1/1972 | Drews et al. |
| 3,705,438 | A | 12/1972 | Stosberg et al. |
| 3,879,796 | A | 4/1975 | Whyte |
| 3,988,800 | A | 11/1976 | Sachser |
| 4,077,087 | A | 3/1978 | Mooney |
| 4,095,532 | A | 6/1978 | Redemann |
| 4,175,783 | A | 11/1979 | Pioth |
| 4,190,002 | A | 2/1980 | Redemann |
| 4,276,962 | A | 7/1981 | Aulik |
| 4,309,791 | A | 1/1982 | Aulik |
| 4,385,414 | A | 5/1983 | Damico |
| 4,414,702 | A | 11/1983 | Neumann |
| 4,439,879 | A | 4/1984 | Werner |
| 4,526,253 | A | 7/1985 | Schmidt |
| 4,677,706 | A | 7/1987 | Screen |
| 4,722,114 | A | 2/1988 | Neumann |
| 4,723,808 | A | 2/1988 | Hines |
| 4,788,741 | A | 12/1988 | Hilborn |
| 4,815,161 | A | 3/1989 | Timmer et al. |
| 4,922,574 | A | 5/1990 | Heiligenthal et al. |
| 5,014,391 | A | 5/1991 | Schulte |
| 5,129,218 | A | 7/1992 | Youngberg et al. |
| 5,139,116 | A | 8/1992 | Screen |
| 5,184,373 | A | 2/1993 | Lange |
| 5,203,149 | A | 4/1993 | Youngberg et al. |
| 5,242,035 | A | 9/1993 | Lange |
| 5,279,010 | A | 1/1994 | Ferrand et al. |
| 5,303,450 | A | 4/1994 | Lange |
| 5,330,064 | A | 7/1994 | Hall |
| 5,348,326 | A | 9/1994 | Fullenkamp et al. |
| 5,377,372 | A | 1/1995 | Rudolf et al. |
| 5,450,639 | A | 9/1995 | Weismiller et al. |
| 5,497,856 | A | 3/1996 | Block et al. |
| 5,503,416 | A | 4/1996 | Aoki et al. |
| 5,634,532 | A | 6/1997 | Bucher |
| 5,737,801 | A | 4/1998 | Flood |
| 5,774,936 | A | 7/1998 | Vetter |
| 5,806,111 | A | 9/1998 | Heimbrock et al. |
| 5,987,671 | A | 11/1999 | Heimbrock et al. |
| 5,991,947 | A | 11/1999 | Lavin et al. |
| 5,996,149 | A | 12/1999 | Heimbrock et al. |
| 6,000,076 | A | 12/1999 | Webster et al. |
| 6,076,208 | A | 6/2000 | Heimbrock et al. |
| 6,163,903 | A | 12/2000 | Weismiller et al. |
| 6,182,310 | B1 | 2/2001 | Weismiller et al. |
| 6,240,579 | B1 | 6/2001 | Hanson et al. |
| 6,264,006 | B1 | 7/2001 | Hanson et al. |
| 6,282,738 | B1 | 9/2001 | Heimbrock et al. |
| 6,286,165 | B1 | 9/2001 | Heimbrock et al. |
| 6,314,597 | B2 | 11/2001 | Heimbrock et al. |
| 6,315,319 | B1 | 11/2001 | Hanson et al. |
| 6,321,878 | B1 | 11/2001 | Mobley et al. |
| 6,330,926 | B1 | 12/2001 | Heimbrock et al. |
| 6,421,854 | B1 | 7/2002 | Heimbrock |
| 6,446,283 | B1 | 9/2002 | Heimbrock et al. |
| 6,453,508 | B1 | 9/2002 | Denner |
| 6,460,205 | B1 | 10/2002 | Lewandowski et al. |
| 6,473,921 | B2 | 11/2002 | Brooke et al. |
| 6,505,359 | B2 | 1/2003 | Heimbrock et al. |
| 6,598,247 | B1 | 7/2003 | Heimbrock et al. |
| 6,658,680 | B2 | 12/2003 | Osborne et al. |
| 6,691,346 | B2 | 2/2004 | Osborne et al. |
| 6,820,294 | B2 | 11/2004 | Shiery et al. |
| 6,865,775 | B2 | 3/2005 | Ganance |
| 7,200,894 | B2 * | 4/2007 | Block et al. .................... 16/18 R |
| 7,302,717 | B2 | 12/2007 | Reinke et al. |
| 7,644,457 | B2 | 1/2010 | Hensley et al. |
| 7,882,580 | B2 | 2/2011 | Hensley et al. |
| 8,122,535 | B2 | 2/2012 | Hensley et al. |
| 2003/0131413 | A1 | 7/2003 | Dietrich |
| 2004/0139545 | A1 | 7/2004 | Reinke et al. |

FOREIGN PATENT DOCUMENTS

| | | | |
|---|---|---|---|
| EP | 0 681 799 | A1 | 11/1995 |
| EP | 1 243 241 | A2 | 9/2002 |
| EP | 1 985 275 | A2 | 10/2008 |
| FR | 2 780 638 | | 1/2000 |
| FR | 2 783 463 | | 3/2000 |
| FR | 2 836 375 | A1 | 8/2003 |
| WO | WO 00/51541 | S2 | 9/2000 |
| WO | WO 02/32271 | A1 | 4/2002 |
| WO | WO 02/076266 | A1 | 10/2002 |
| WO | WO 03/072373 | A1 | 9/2003 |

* cited by examiner

HOSPITAL BED HAVING CASTER BRAKING ALARM

CROSS REFERENCE TO RELATED APPLICATIONS

This application is a divisional of U.S. application Ser. No. 13/021,823, filed Feb. 7, 2011, now U.S. Pat. No. 8,122,535, which is a continuation of U.S. application Ser. No. 12/630,153, filed Dec. 3, 2009, now U.S. Pat. No. 7,882,580, which is a continuation of U.S. application Ser. No. 10/557,524, filed Nov. 8, 2006, now U.S. Pat. No. 7,644,457, which is the U.S. national phase under 35 U.S.C. §371 of PCT International Application No. PCT/US2004/016260, which has an international filing date of May 20, 2004, designating the United States of America, and which claims the benefit of U.S. Provisional Patent Application Ser. No. 60/472,260, filed May 21, 2003, the disclosures of each of which are hereby expressly incorporated by reference herein.

BACKGROUND AND SUMMARY OF THE INVENTION

The present invention relates to a hospital bed. More particularly, the present invention relates to a hospital bed having siderails, an articulating deck, and a mattress.

Hospital bed and other patient supports are known. Typically, such patient supports are used to provide a support surface for patients or other individuals for treatment, recuperation, or rest. Many such patient supports include a frame, a deck supported by the frame, a mattress, siderails configured to block egress of a patient from the mattress, and a controller configured to control one or more features of the bed.

Additional features of the present invention will become apparent to those skilled in the art upon consideration of the following detailed description of an illustrated embodiment exemplifying the best mode of carrying out the invention as presently perceived.

BRIEF DESCRIPTION OF THE DRAWINGS

A detailed description particularly refers to the accompanying figures in which.

DETAILED DESCRIPTION

Figure 1:
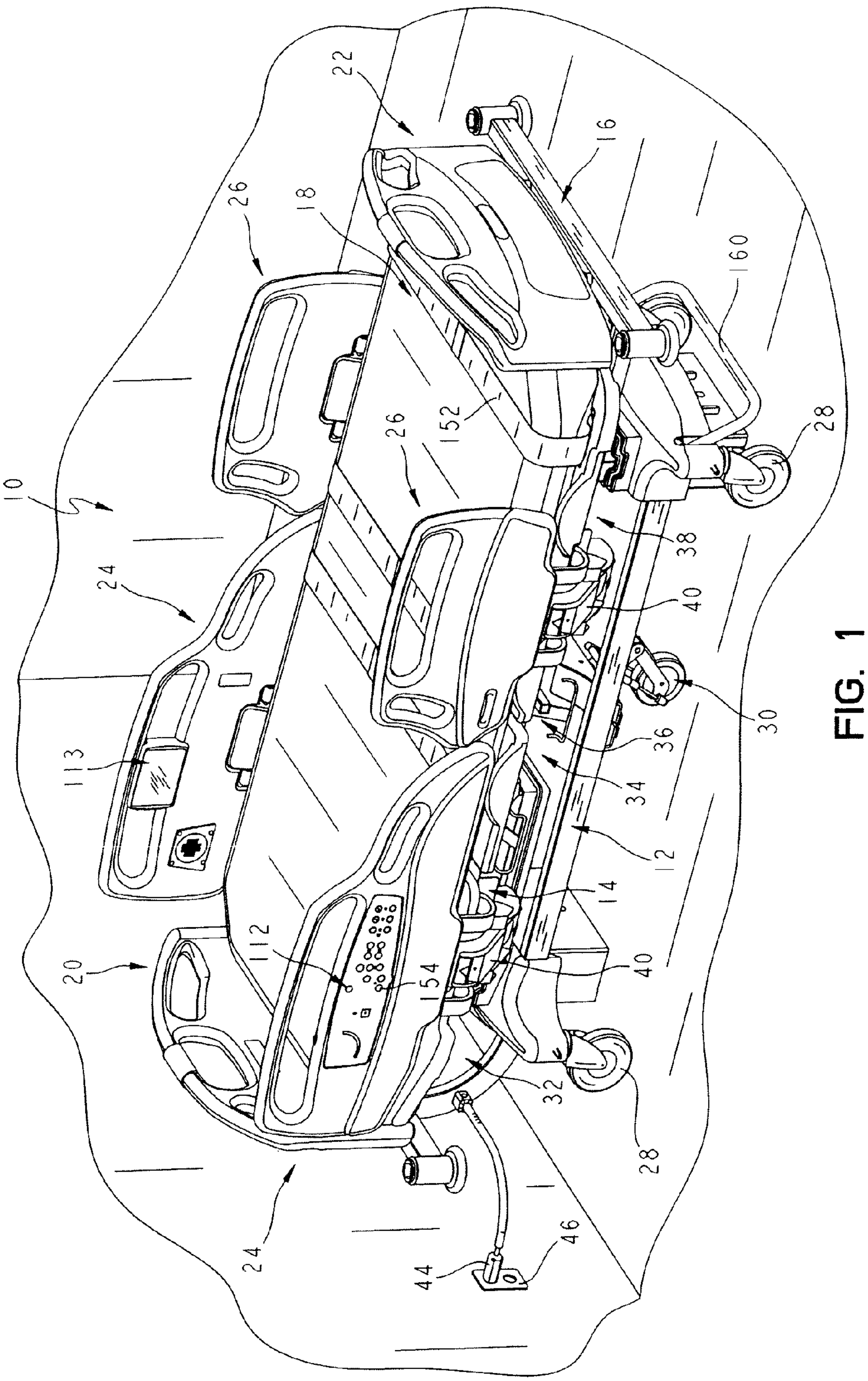
FIG. 1 is a perspective view of a patient support according to the present disclosure showing the patient support including a frame, a deck, a mattress supported by the deck, a head board, a foot board, a pair of head end siderails, and a pair of foot end siderail.

A patient support 10 according to the present disclosure is shown in FIG. 1. Patient support 10 includes a base frame 12, an intermediate frame 14 supported by base frame 12, a deck 16 supported by intermediate frame 14, a mattress 18 supported by deck 16, a headboard 20, a footboard 22, a pair of head end siderails 24, and a pair of foot end siderails 26. Footboard 22 is positioned over an extendable foot support. Additional details of a suitable extendable foot support is provided in European Patent Publication No. EP0681799 A1, titled "Blocking device for an extension relative to a piece of furniture, and piece of furniture equipped with it," filed May 5, 1995, to Pascal Guguin, the disclosure of which is expressly incorporated by reference herein.

Base frame 12 is supported on the floor by a plurality of caster wheels 28 and a centered or fifth wheel assembly 30. Intermediate frame 14 is coupled on each end to extendable columns 31 which can be extended or retracted to position intermediate frame 14 and deck 16 in the Trendelenburg or Reverse Trendelenburg positions. Additional details of suitable extendable columns is provided in French Patent Publication No. FR2780638, titled "Hospital bed with telescoping columns," filed Jul. 1, 1998, to Robic Dominique, the disclosure of which is expressly incorporated by reference herein.

Deck 16 is configured to articulate between a plurality of positions. Deck 16 includes a head section 32, a seat section 34, a thigh section 36, and a foot section 38 which are pivotably coupled together.

Head end siderails 24 are coupled to head section 32 and may be moved between raised and lowered positions by siderail linkages 40. Additional details of suitable siderail linkages are provided in PCT Publication No. WO 02/32271 A1, titled "Bed with Articulated Barrier Elements," filed Oct. 18, 2000, to Hensley et al. and U.S. Pat. No. 6,163,903, titled "Chair Bed," filed Feb. 4, 1998, to Weismiller et al, the disclosures of which are expressly incorporated by reference herein. Foot end siderails 26 are coupled to intermediate frame 14 by siderail linkages 40 between thigh section 36 and foot section 38 and can also be moved between raised and lowered positions.

A control system is provided to control various functions of patient support 10. The control system and the remainder of patient support 10 are powered by a building's power supply through an AC plug connector 44 coupled to a building outlet 46. If AC plug connector 44 is unplugged from building outlet 46 or the building's power is lost, patient support 10 is powered by a battery (not shown) supported by base frame 12.

Figure 2:
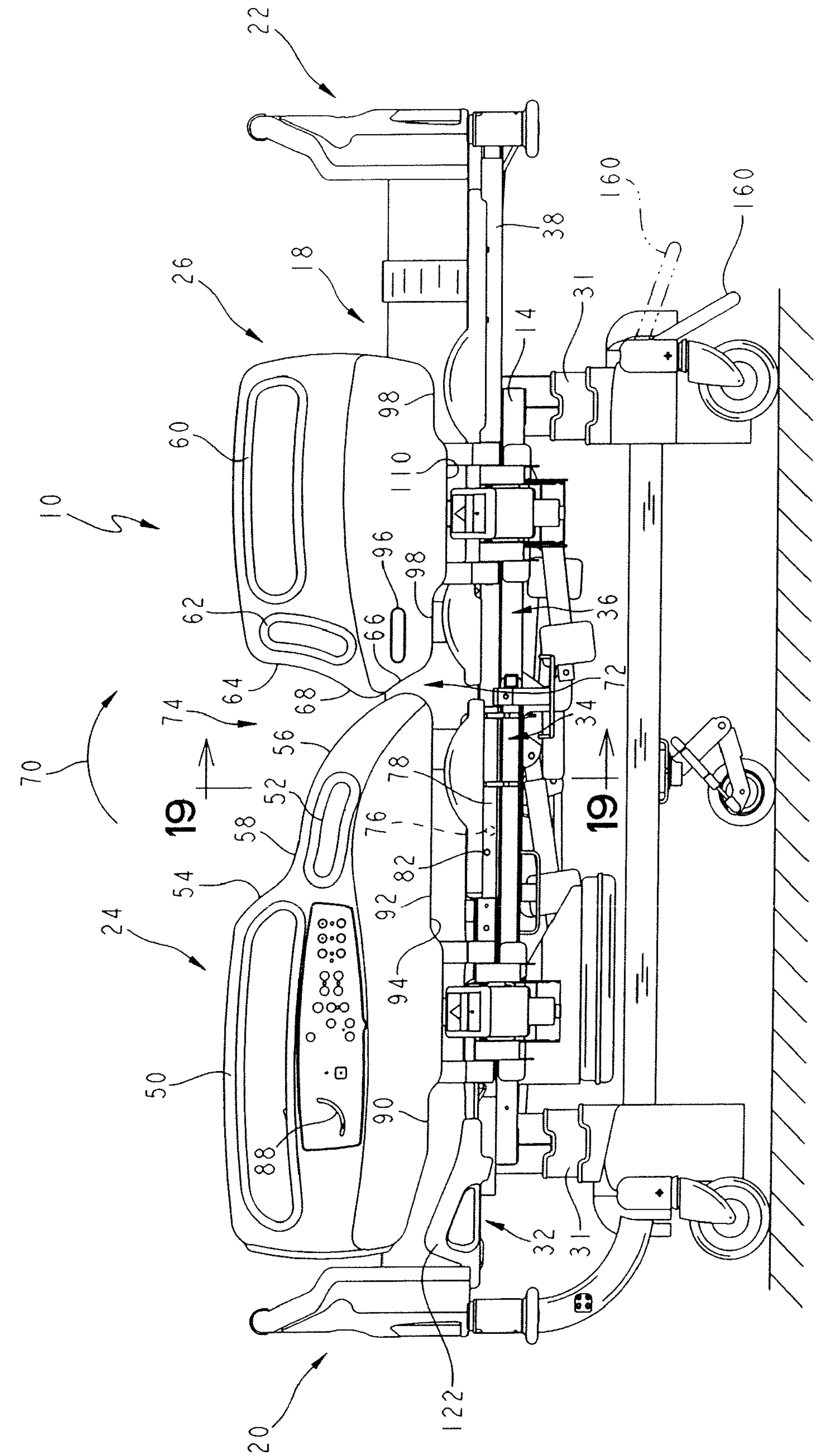
FIG. 2 is a side elevation view showing the mattress supported in a flat and horizontal position.
Figure 3:
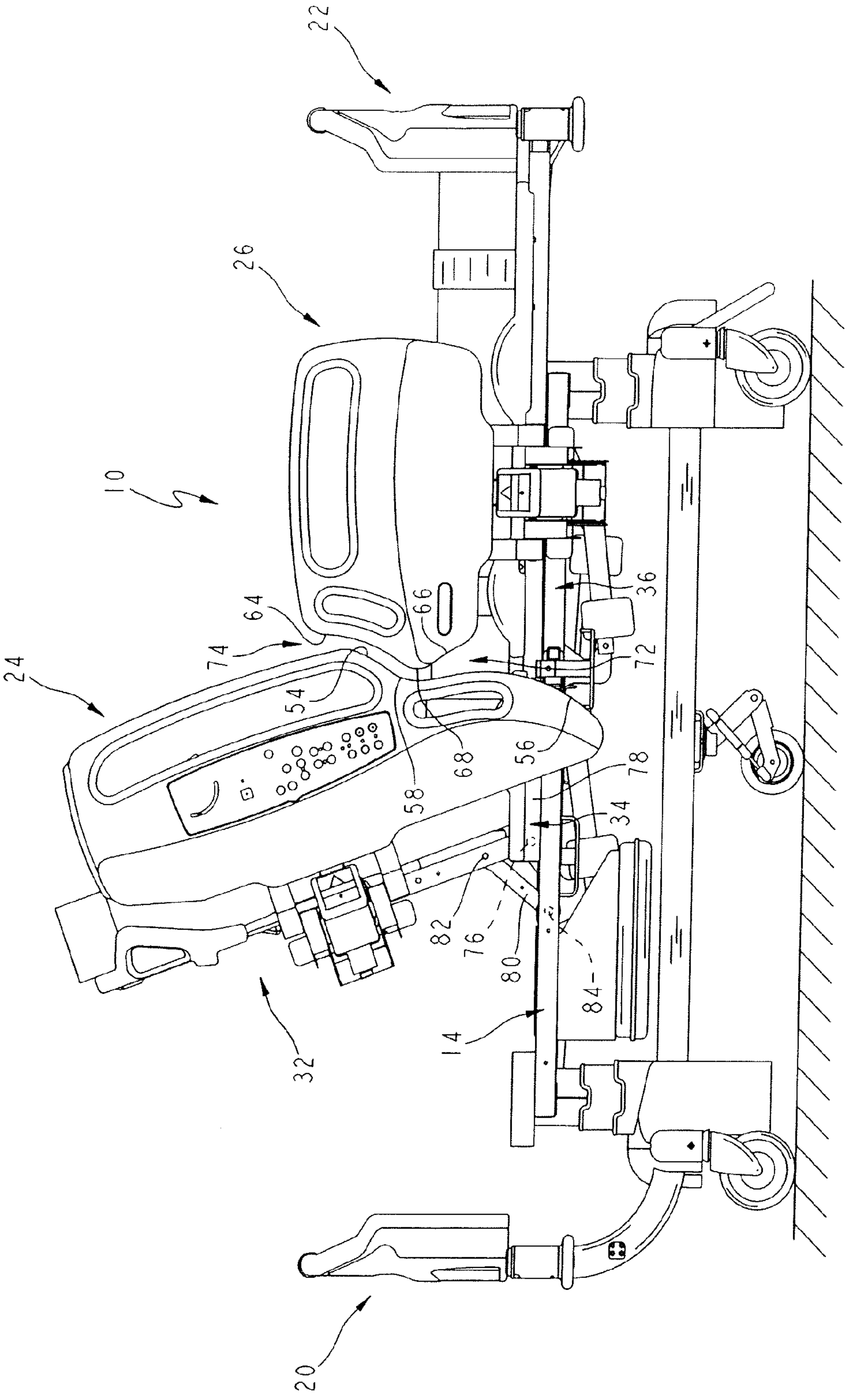
FIG. 3 is a view similar to FIG. 2 showing a head section of the deck in a raised position and the head and foot end siderails having complementary profiles.
Figure 10:
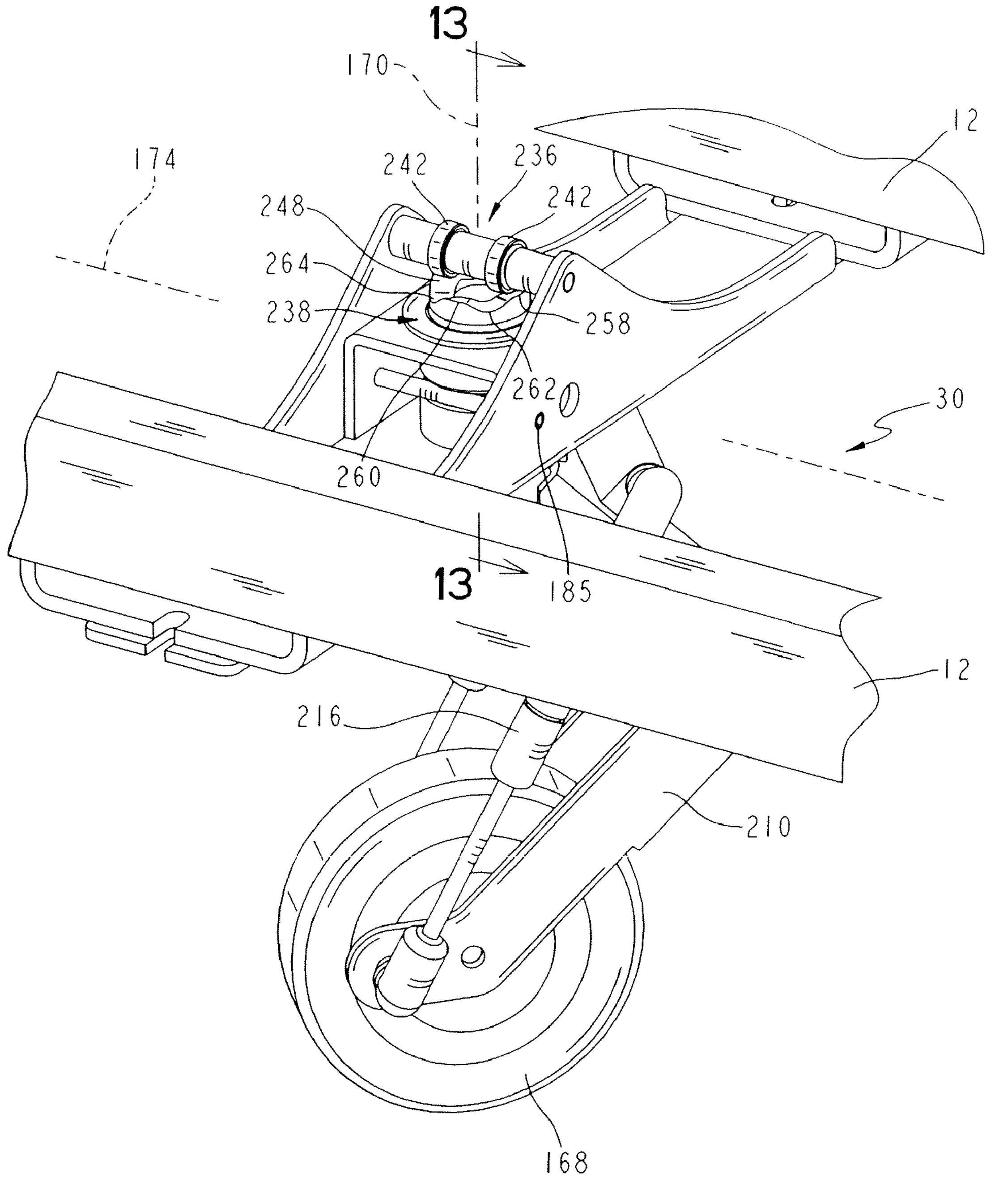
FIG. 10 is a view similar to FIG. 9 showing the wheel facing in a direction that is neither parallel or perpendicular with the longitudinal axis of the patient support.

As shown in FIG. 2, head section siderail 24 include handles 50, 52, upper portion 54, lower portion 56, and notch 58. Foot section siderail 26 includes handles 60, 62, upper portion 64, lower portion 66, and extended portion 68. Deck 16 can be moved into an articulated position, as shown in FIG. 10, by moving head section 32 in direction 70. As shown in FIG. 3, upper portion 54 of head section siderail 24 complements upper portion 66 of foot section siderail 26 so that head section siderail 24 does not interfere with foot section siderail 26 when deck 16 is in the articulated position.

Lower portion 56 of head section siderail 24 and lower portion 66 of foot section siderail 26 are also shaped to correspond with one another so that a gap 72 defined between lower portions 56, 66 remains substantially constant during articulation of deck 16. During articulation of deck 16, a gap 74 defined between upper portions 66, 52 narrows significantly while gap 72 between lower portions 60, 58 remains substantially constant. In the articulated orientation with both siderails 24, 26 in the raised position, as shown in FIG. 3, notch 58 is positioned to receive extended portion 68 of foot section siderail 26.

Figure 4:
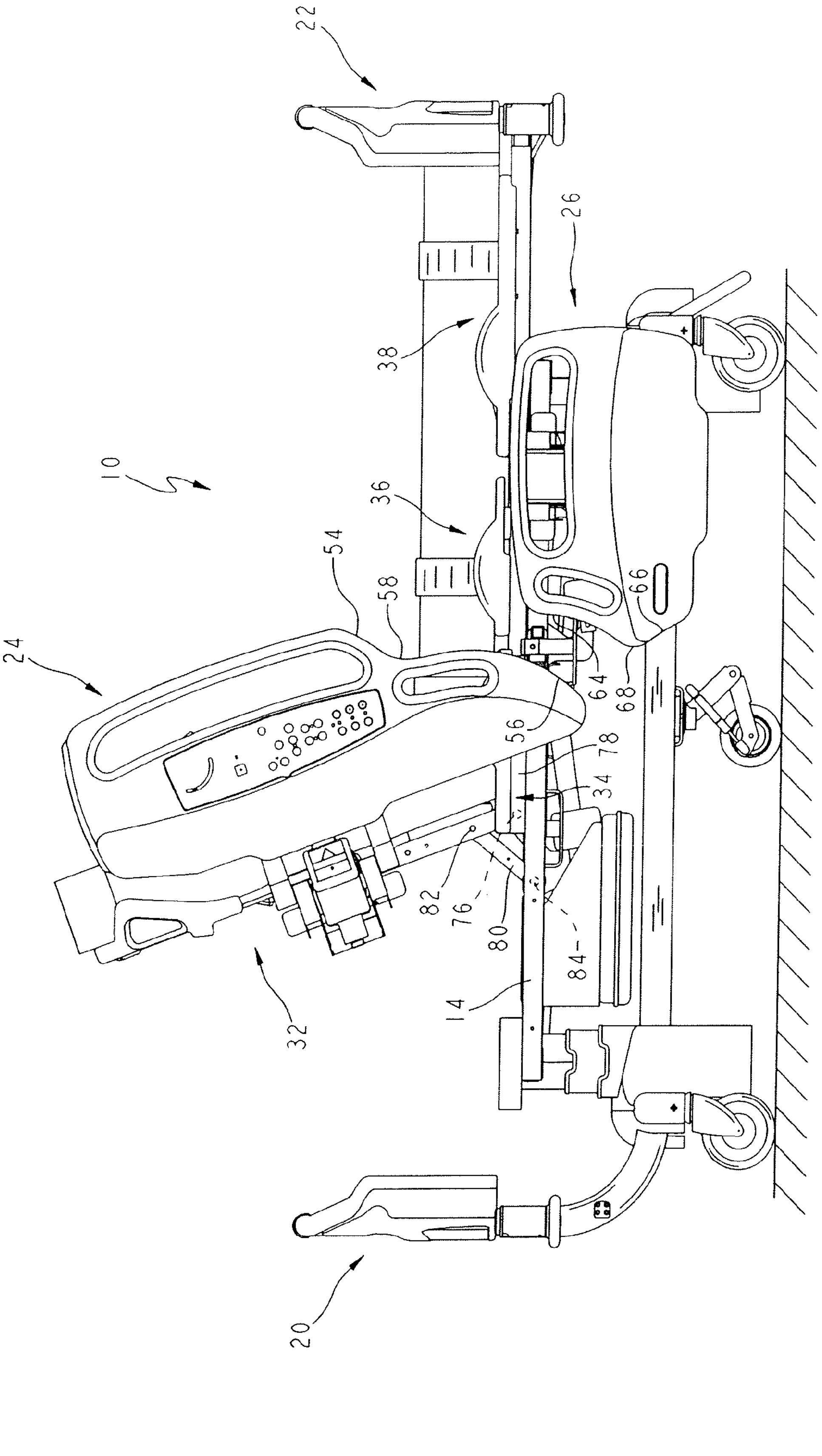
FIG. 4 is a view similar to FIG. 3 showing the foot end siderail in a lowered position and the head and foot end siderails having complementary profiles permitting the foot end siderail to be lowered when the head section of the deck is raised.

As shown in FIG. 4, when foot section siderail 26 is moved to the lowered position, the curvature of upper portion 64 of foot section siderail 26 is configured to complement the curvature of lower portion 56 of head section siderail 24. The radius of curvature of upper portion 64 of foot section siderail 26 is configured to be substantially centered about a pivot axis 76 of head section 32. This allows foot section siderail 26 to be moved between the raised and lowered positions when the deck is in the articulated position as shown in FIGS. 3 and 4. A portion of the radius of curvature of lower portion 56 of head section siderail 24 is also substantially centered about pivot axis 76.

Head section 32 is pivotably and slidably coupled to a channel or rail 78 at pivot axis 76 (shown in phantom). Rail 78 is coupled to intermediate frame 14. Rail 78 includes a slot (not shown) that allows pivot axis 76 of head section 32 to slide horizontally as head section 32 is moved between the substantially coplanar position as shown in FIG. 2 and the articulated position as shown in FIG. 3. A link 80 is pivotably coupled on one end to head section 32 at a pivot axis 82 and coupled to intermediate frame 14 on the other end at a pivot axis 84.

Referring now to FIGS. 2 and 3, as head section 32 rotates in direction 70 into the articulated position, pivot axis 76 slides in the slot in rail 78 towards foot board 22. Additional details of rail 78 and link 80 are provided in PCT Publication No. WO 02/076266 A1, titled "Bed Equipped with a Back Elevator," filed Mar. 26, 2002, to Gippert et al., the disclosure of which is expressly incorporated by reference herein.

Head section siderail 24 also includes angle indicator 88 which, in the preferred embodiment, includes a slot formed in siderail 24 and a ball bearing movable in the slot to indicate the angle of inclination of head section 32 relative to intermediate frame 14. Head section siderail 24 also includes recessed portions 90, 92 along lower edge 94 of head section siderail 24. Recessed portions 90, 92 allow a caregiver to comfortably stand beside patient support 10 when head section siderail 24 is in the lowered position without interfering with the care givers' feet.

Foot section siderail 26 also includes an angle indicator 96 which, in the preferred embodiment, includes a slot formed in siderail 26 and a ball bearing movable in the slot to indicate the angle of inclination of intermediate frame 14 relative to the floor. Position indicator 96 can be used to determine the position of deck 16 relative to the floor during movement by columns 31. Additional description of angle indicators 88, 96 is provided in U.S. Pat. No. 6,182,310, titled "Bed Side Rails," filed Jan. 12, 1998, to Weismiller et al., the disclosure of which is expressly incorporated by reference herein.

Foot section siderail 26 also includes recessed portions 98 on a lower edge 110. Recessed portions 98 are shaped to allow a caregiver to stand adjacent patient support 10 when siderail 26 is in the lowered position. Recessed portions 98 are shaped to eliminate or minimize contact with the caregivers' feet when he or she is positioned next to patient support 10.

As shown in FIG. 1, the control system of patient support 10 includes siderail controls 112 permanently coupled to head end siderails 24 and pendent controls 113 removably coupled to any of head and foot end siderails 24, 26. Additional details of suitable siderail controls and pendant controls is provided in U.S. patent application Ser. No. 09/750,741, titled "Hospital Bed," filed Dec. 29, 2000, to Osborne et al. and U.S. Patent Application Ser. 60/408,698, titled "Hospital Bed," filed Sep. 6, 2002, to Menkedick et al., the disclosures of which are expressly incorporated by reference herein.

Figure 5:
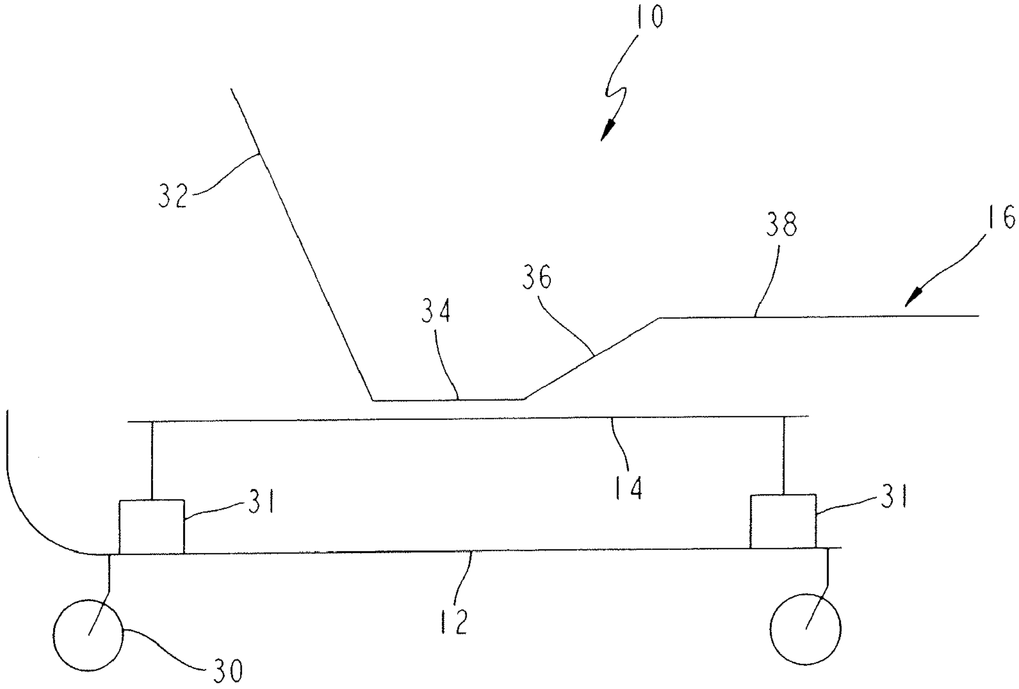
FIG. 5 is a diagrammatic view showing an intermediate frame of the patient support in a horizontal position and the deck in an articulated position.
Figure 6:
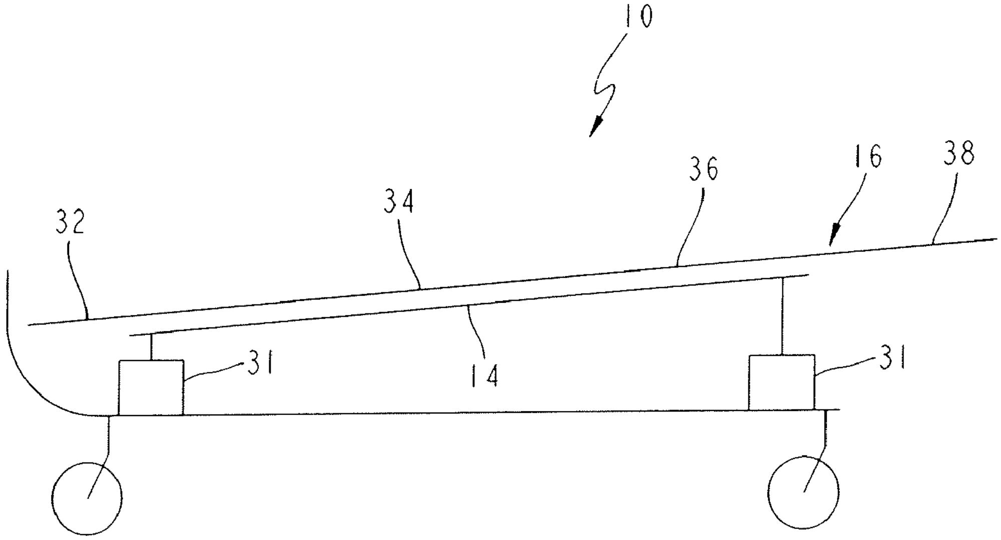
FIG. 6 is a view similar to FIG. 5 showing the intermediate frame in the Trendelenburg position and the deck in a substantially flat position.

Siderail controls 112 are configured to actuate a shock feature of patient support 10. Referring now to FIGS. 5 and 6, when the shock feature provide by siderail control 112 is activated, the control system flattens deck 16 to a substantially coplanar orientation, as shown in FIG. 1, and positions deck 16 in the Trendelenburg position simultaneously. If patient support 10 is in the articulated orientation, as shown in FIG. 5, when siderail control 112 is activated, sections 34, 36, 38 of deck 16 are lowered to the substantially coplanar orientation and extendable column 31 at the head end of patient support 10 is lowered while extendable column 31 at the foot end of patient support 10 is extended to position deck 16 in the Trendelenburg position as shown in FIG. 6. Siderail control 112 can be a momentary switch or any other suitable user input device. In the preferred embodiment, the control system begins flattening deck 16 and moving deck 16 into the Trendelenburg position only while the siderail control 112 is activated when a button (not shown) is depressed.

Figure 18:
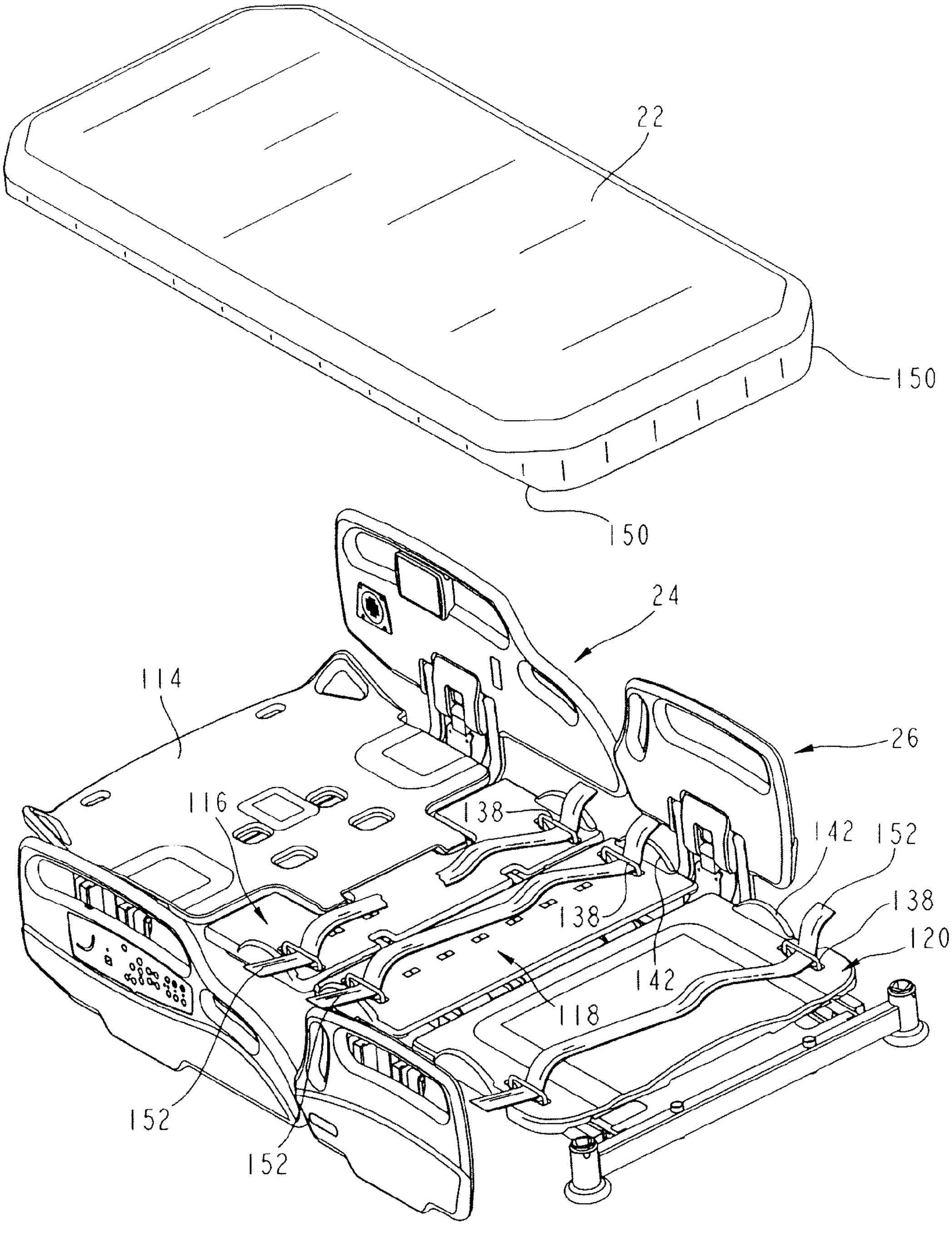
FIG. 18 is perspective view of the deck showing patient restraint straps coupled to the deck.

Referring now to FIG. 18, deck 16 includes a head deck panel 114, a seat deck panel 116, a thick deck panel 118, and a foot deck panel 120. Head deck panel 114 is rigidly coupled to head section 34 and seat, thigh, and foot deck panels 116, 118, 120 are removable from seat and foot sections 36, 38 of deck 16. Deck panels 114, 116, 118, 120, head section siderail 24, and headboard 20 are preferably formed of blow-molded plastic so that they are hollow. According to alternative embodiments of the present disclosure, other suitable materials such as metal, wood, or composites may also be used.

Figure 20:
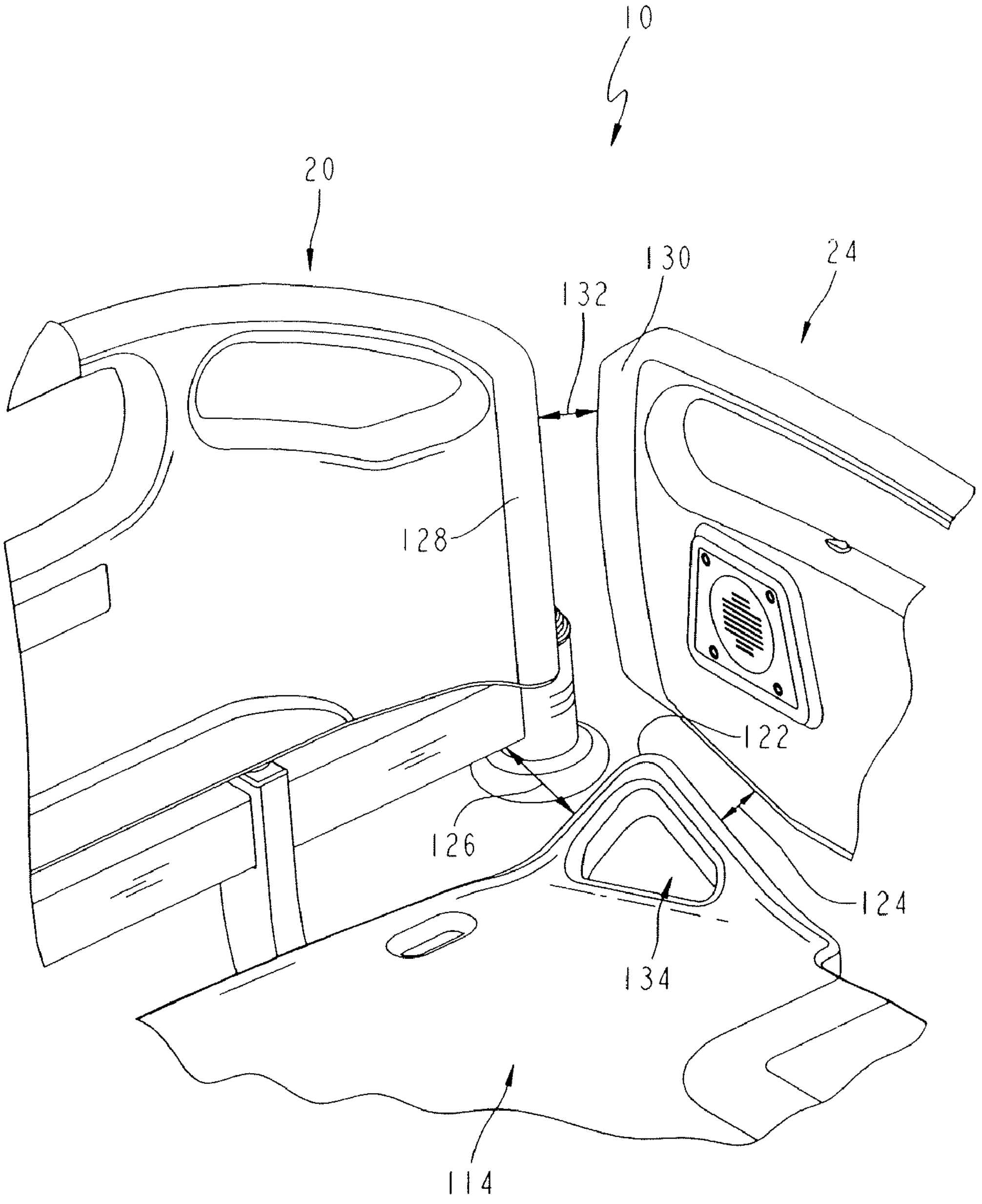
FIG. 20 is a perspective view of a portion of the patient support of FIG. 1 showing a head end deck panel, the head board, and one of the head end siderails having curved portions that converge to partially fill gaps defined therebetween.
Figure 21:
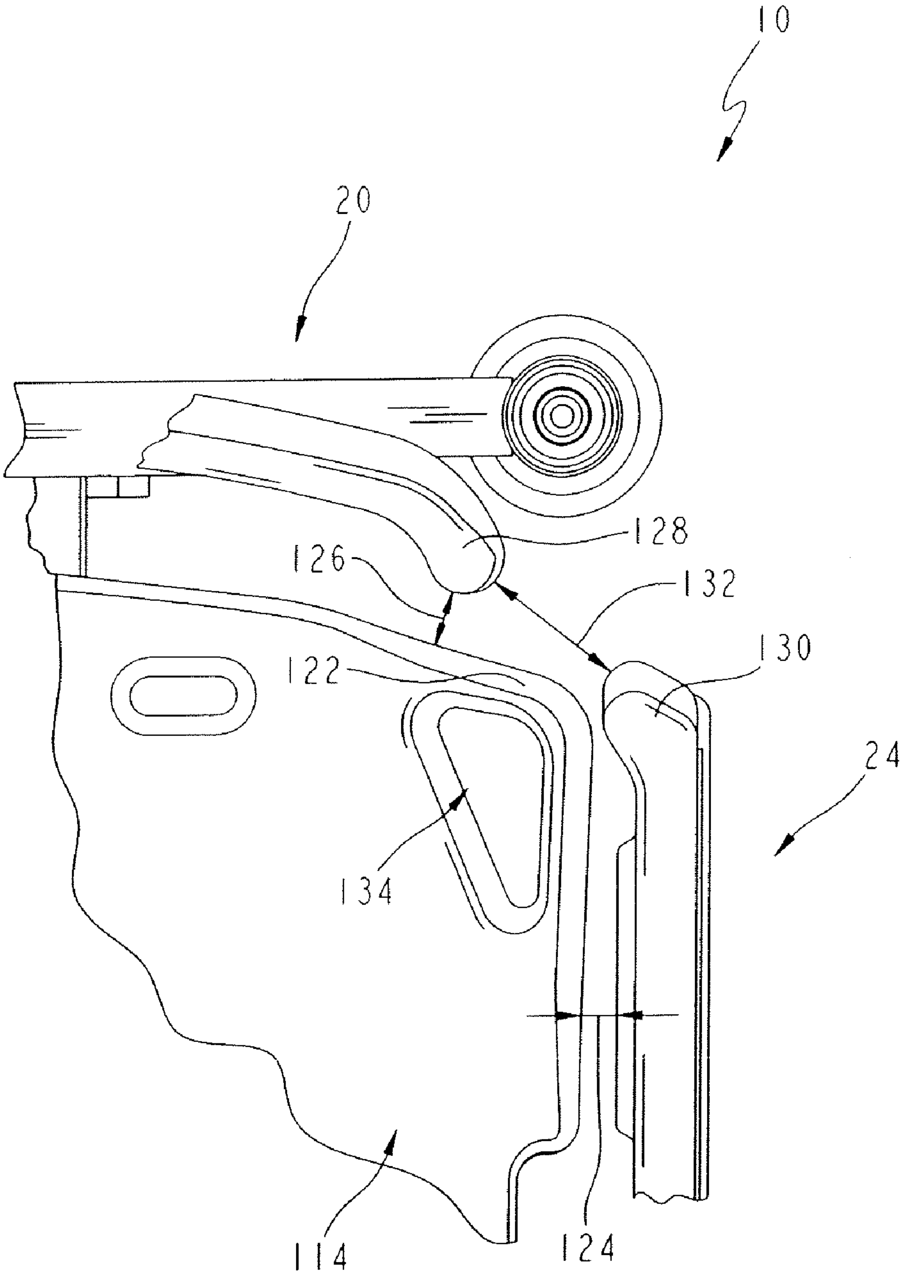
FIG. 21 is a top plan view showing the curved portions of the head board and the head end siderail.

As shown in FIG. 20, corner portions 122 of deck panel 114 is elevated to narrow gaps 124, 126 defined between head section siderail 24 and deck panel 114 and headboard 20 and deck panel 114, respectively. Headboard 20 includes curved portions 128 and head section siderail 24 includes curved portions 130. Curved portions 128, 130 are configured to narrow gap 132, as shown in FIG. 21, defined between headboard 20 and head section siderail 24.

Curved portions 128, 130 and corner portion 122 of head deck panel 114 converge together to narrow gaps 124, 126, 132. In the preferred embodiment, hand holes 134 are provided in corner portions 122 of head deck panel 114 to permit a caregiver to grab head section deck panel 114 to move patent support 10. In the preferred embodiment, curved portions 128, 130, and corner portion 122 are provided at each corner of the longitudinal end of the head end of patient support 10. According to alternative embodiments of the present disclosure, the converging portions are also provided on the foot end of the patient support.

Figure 16:
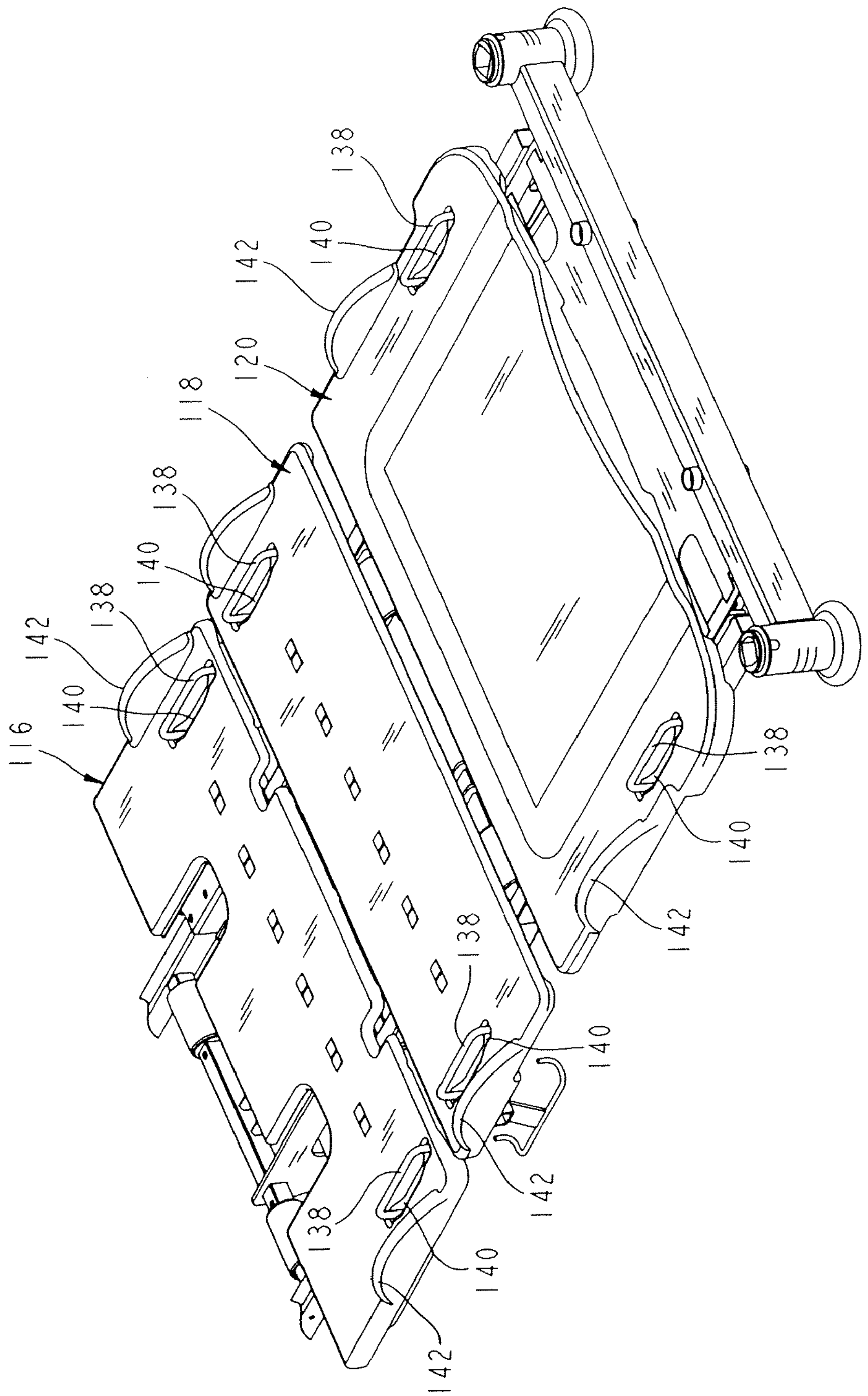
FIG. 16 is a perspective view of portions of the deck showing the deck including three removable deck panels.
Figure 17:
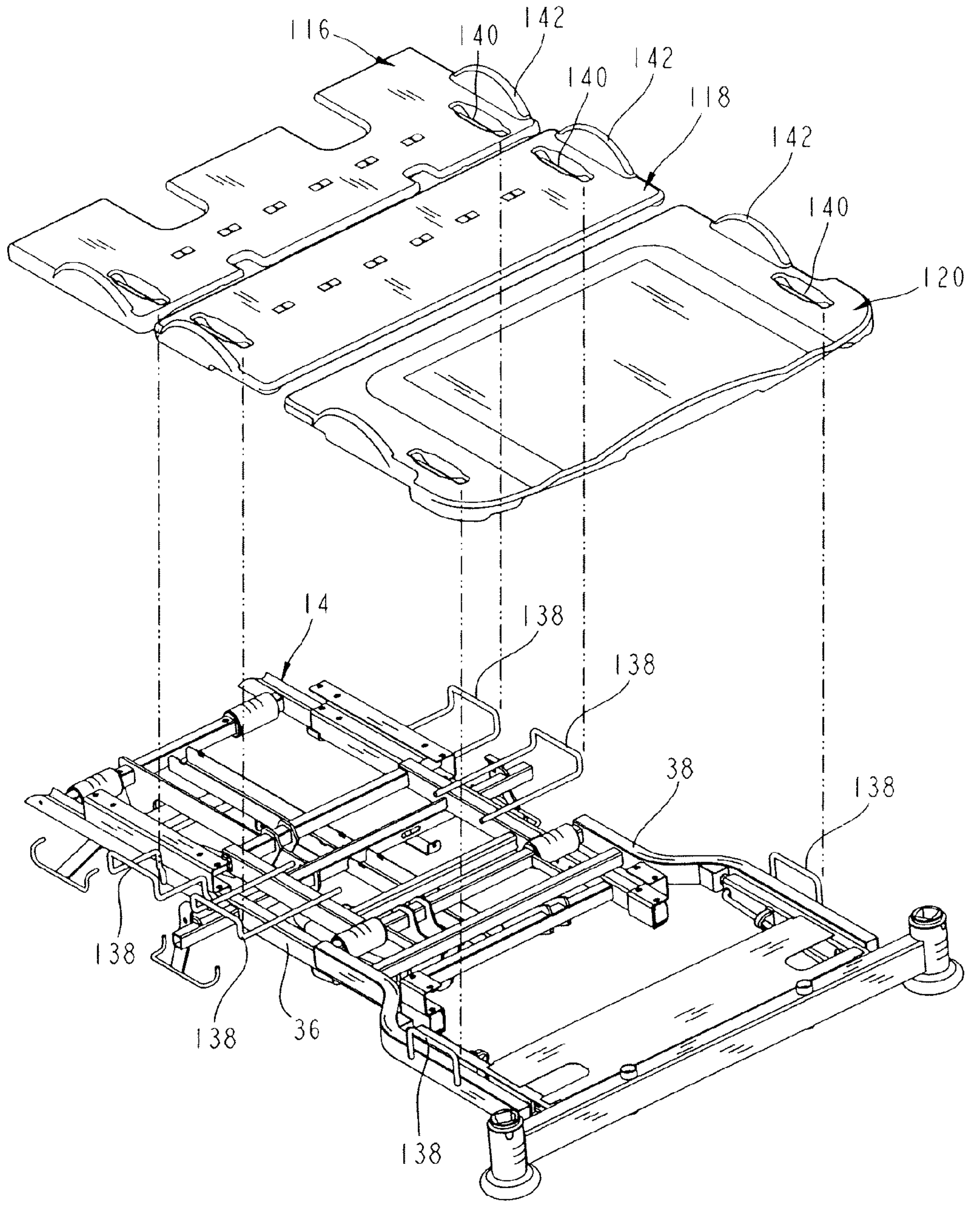
FIG. 17 is a view similar to FIG. 16 showing the deck panels removed from the remainder of the deck.

Referring now to FIGS. 16 and 17, deck 16 and deck panels 116, 118, 120 are shown that support mattress 18. Deck panel 116 is removably coupled to seat section 34 of deck 16 by restraint holders 138. Deck panel 116 includes openings 140 which are sized to fit over restraint holders 138. Deck panel 116 can be removed from seat section 34 of deck 16 by lifting deck panel 116 above restraint holders 138. Deck panels 118, 120 also include openings 140 which receive respective restraint holders 138 in the same fashion.

Deck panels 116, 118, 120 also include gap fillers 142 positioned adjacent the ends of head and foot end siderails 24, 26. In the preferred embodiment, gap fillers 142 are semicircular-shaped or half moon-shaped and are integral with deck panels 116, 118, 120. Gap fillers 142 are positioned under mattress 18 when mattress 18 is positioned on deck panels 116, 118, 120. As shown in FIG. 2, gap fillers 142 are designed to narrow the respective gaps 144, 146, 148 defined between deck panels 116, 118, 120 and lower edges 76, 72 of head and foot end siderails 24, 26, respectively. Similar gap fillers are also disclosed in PCT Publication No. WO 02/076266 A1, titled "Bed Equipped with a Back Elevator," filed Mar. 26, 2002, to Gippert et al. and French Patent Application No. FR 01 08540, titled "Lit Medicalise a Plan de Couchage Amovible," filed Jun. 28, 2001, to Barbu et al., the disclosures of which are expressly incorporated by reference herein.

Figure 19:
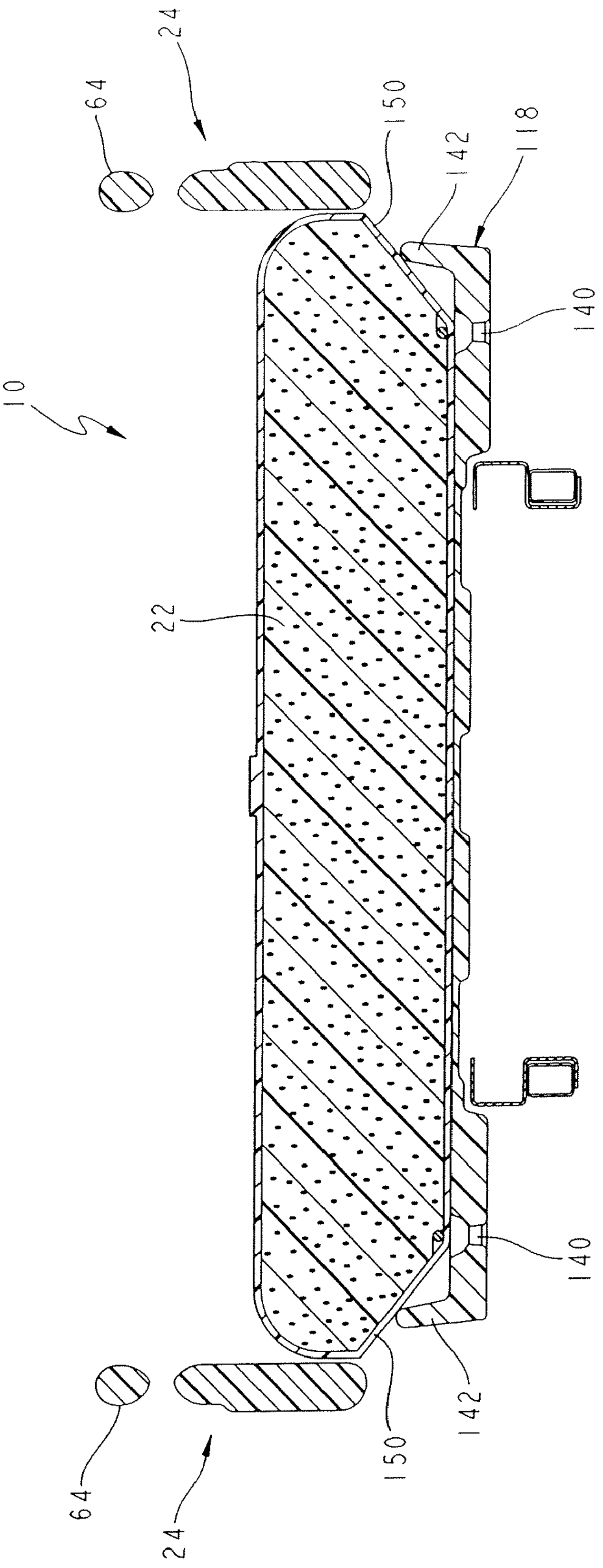
FIG. 19 is a cross-sectional view taken along lines 19-19 of FIG. 2 showing one of the removable deck panels including gap fillers positioned adjacent to the head end siderails to partially fill the gap therebetween and the mattress including chamfered corners to receive the gap fillers.

Referring now to FIGS. 18 and 19, mattress 18 includes chamfered lower corner portions 150 that extend along the length of each longitudinal side of mattress 18. As shown in FIG. 19, chamfered portions 150 permits mattress 18 to be positioned on deck panels 114, 116, 118, 120 without interference from the gap fillers 142. As shown in FIG. 19, gap filler 142 contacts chamfered portions 150 of mattress 18 to prevent mattress 18 from moving laterally when positioned on deck 16. According to an alternative embodiment of the present disclosure, the chamfered portions are only provided at the locations of the gap fillers.

As shown in FIG. 18, restraint holders 138 extend through openings 140 in deck panels 116, 118, 120. Restraint straps 152 are provided that are placed through restraint holders 138 and extended around mattress 18 as shown in FIG. 1. Restraint straps 152 are placed over a patient to secure the patient to patient support 10. According to alternative embodiments of the present disclosure, the restraint holders do not extend completely through the openings in the respective deck panels. Additional details of suitable restraint holders and restraint straps are provided in French Patent Application No. FR 01 08540, titled "Lit Medicalise a Plan de Couchage Amovible," filed Jun. 28, 2001, to Barbu et al., the disclosures of which are expressly incorporated by reference herein.

As shown in FIG. 1, the control system includes a battery enable switch 154, which allows a person, such as a caregiver to operate the electrically controlled functions of patient support 10 using battery power when AC power is not available. In the illustrated embodiment, one battery enable switch 154 is located on head section siderail 24 and another battery enable switch (not shown) is located on pendent controller 113. According to alternative embodiments of the present disclosure, the battery enable switch is located anywhere on the patient support as necessary or convenient. Battery enable switches 154 are electrically coupled to the battery system (not shown).

Battery enable switch 154 is a momentary switch such as a push button in the preferred embodiment, although any other suitable switch could be used. In the preferred embodiment, switch 154 includes a light emitting diode (LED) enclosed in a translucent or transparent plastic housing. The LED is "on" (i.e., illuminated) when either AC or battery power is being supplied to patient support 10. When patient support 10 is disconnected from AC power, such as when a plug 44 is disconnected from wall socket 46, switch 154 ceases being illuminated.

When AC power to patient support 10 is cutoff, a timing circuit (not shown) is initiated. In the preferred embodiment, after patient support 10 is disconnected from AC power for twenty minutes and any of the electrically controlled features of patient support 10 have not been actuated for a time period of twenty minutes, patient support 10 is placed in sleep mode. In sleep mode, minimal power is provided to patient support 10 by the battery backup system. During sleep mode, the electrical operable functions of patient support 10 are disabled.

In the preferred embodiment, when the patient support 10 is running on battery power provided by the battery, activation of one of the battery enable switches 154 causes patient support 10 to switch out of sleep mode and receive sufficient power from the battery so that at least certain electrically operational functions of patient support 10, such as movement of patient support 10 into emergency Trendelenburg position, can be performed. In the illustrated embodiment, battery enable switch 154 is activated by the application of pressure on one of switches 154 with ones' finger. According to an alternative embodiment, the battery enable switches are not provided and activating any one of the bed function control buttons while patient support 10 is in sleep mode will switch it out of sleep mode.

In the preferred embodiment, the timing circuit waits for a predetermined time period of twenty minutes so that if no operational activity occurs within the twenty minute period after the battery enable switch 154 has been activated or since the previous operational activity, patient support 10 enters sleep mode. If one of the bed function control buttons is activated within the twenty minute time period, the timing circuit is reset to zero. In this manner, battery power is conserved and a smaller battery can be used to support the battery system.

Battery enable switches 154 permit patient support 10 to meet regulatory requirements by enabling at least certain of the bed's operational features to be operable on battery backup power only when needed. According to alternative embodiments of the present disclosure, the timing circuit can be set to enter sleep mode after any predetermined time period, such as five minutes, one hour, etc. Details of another suitable battery enable system is provided in U.S. Patent Application Ser. 60/408,698, titled "Hospital Bed," filed Sep. 6, 2002, to Menkedick et al., the disclosure of which is expressly incorporated by reference herein.

Figure 7:
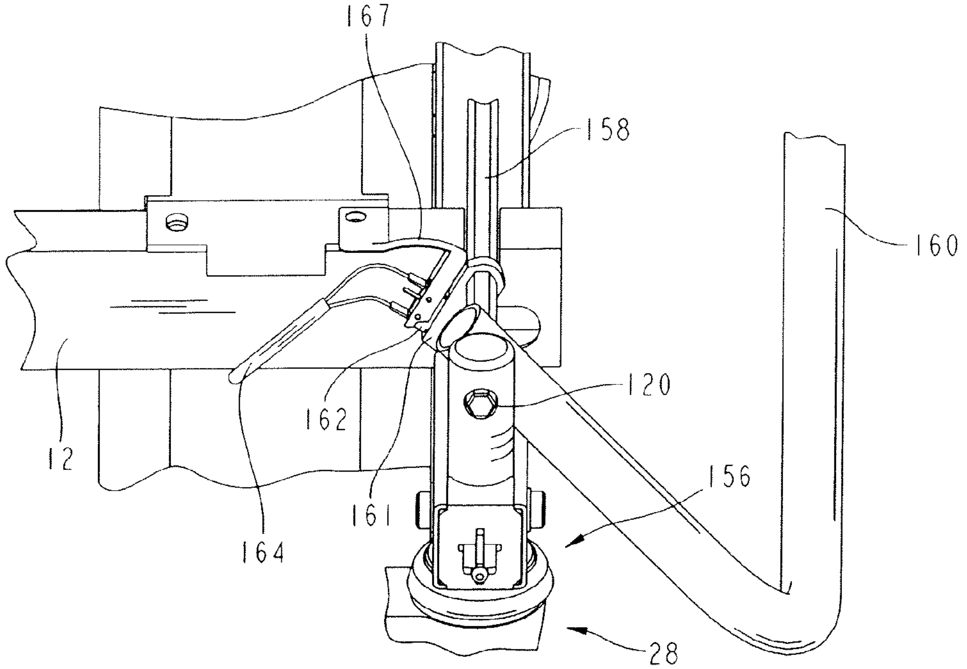
FIG. 7 is a perspective view of a portion of the patient support of FIG. 1 showing portions of a caster wheel, a brake pedal in a braked position, and a brake position detection switch.
Figure 8:
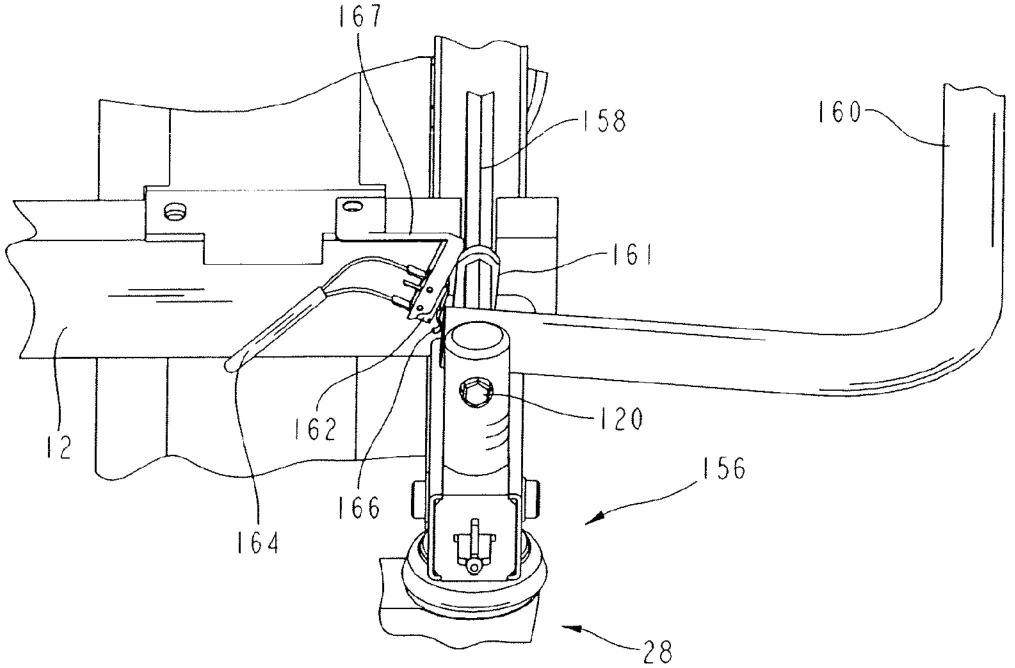
FIG. 8 is a view similar to FIG. 7 showing the brake pedal in an un-braked position.

Referring now to FIGS. 7 and 8, patient support 10 includes a brake alarm that produces an audible and/or visual alarm signal when a brake 156 that locks caster wheel 28 is moved from the braked position, as shown in FIG. 7, to the unbraked position as shown in FIG. 8 while patient support 10 is still connected to AC power through wall socket 46. By activating the alarm, damage to plug 44 and other components of patient support 10 can be avoided.

Brake 156 includes a brake pedal 160 that rotates an octagonal brake shaft 158 to move brake 156 between the braked and unbraked positions. A lever 161 is coupled to brake shaft 158 so that as brake shaft 158 rotates, lever 161 also rotates. Additional details of a suitable brake is provided in French Patent Application FR02 02510, titled "Cadre de Dispositif a Usage Medical Ou Paramedical de Support Roulant d'une Personne, a Roulettes Facilement Demontables, et Dispositif Ainse Equuipe", filed Feb. 28, 2002, to Gippert et al., and corresponding PCT Application No. unknown claiming priority, to Gippert et al., which claims priority to French Patent Application FR 02 02510, the disclosures of which are expressly incorporated by disclosure herein.

A switch 162 is provided that is coupled to a brake alarm controller (not shown) of the control system via wires 164. Switch 162 includes a spring 166 positioned adjacent to lever 161. Switch 162 is coupled to frame 24 by another spring 167. In the preferred embodiment, spring 167 is made of a resilient metallic material to permit some movement of switch 162.

When brake 156 is in the braked position, as shown in FIG. 7, lever 161 depresses spring 166 on switch 162 to complete an electrical circuit. When brake 156 is moved to the unbraked position, as shown in FIG. 8, lever 161 is rotated away from spring 166. Spring 166 is then biased away from electrical switch 162 and the electrical circuit is broken. The brake alarm controller detects that the circuit has been broken and determines that brake 156 has moved from the braked position to the unbraked position. According to alternative embodiments of the present disclosure, the braked and unbraked positions of brake 156 are reversed or the brake alarm controller is programmed to activate the brake alarm signal when the circuit is completed rather than broken.

When the brake alarm controller determines that brake 156 is no longer in the braked position, it determines if patient support 10 is still plugged into an AC power source such as wall socket 46. If plug 44 of patient support 10 is plugged in to wall socket 46 and receiving AC power while brake 156 is in the unbraked position, an alarm such as an audible alarm and/or a flashing indicator light on control panel 112 will signal to warn the caregiver not to move patient support 10 until plug 44 is removed from wall socket 46.

Referring now to FIGS. 9-15, fifth wheel assembly 30 is coupled to frame 24 of patient support 10. Fifth wheel assembly 30 is configured to assist a caregiver in steering patient support 10 by providing a central pivot point about which to turn patient support 10.

Fifth wheel assembly 30 includes a caster wheel 168 that rolls along the floor and is configured to pivot or swivel about a vertical axis 170. Fifth wheel assembly 30 further includes a wheel position holder 172 configured to permit such swiveling. However, position holder 172 also encourages or urges caster wheel 168 to remain in predetermined orientation relative to vertical axis 170.

Figure 9:
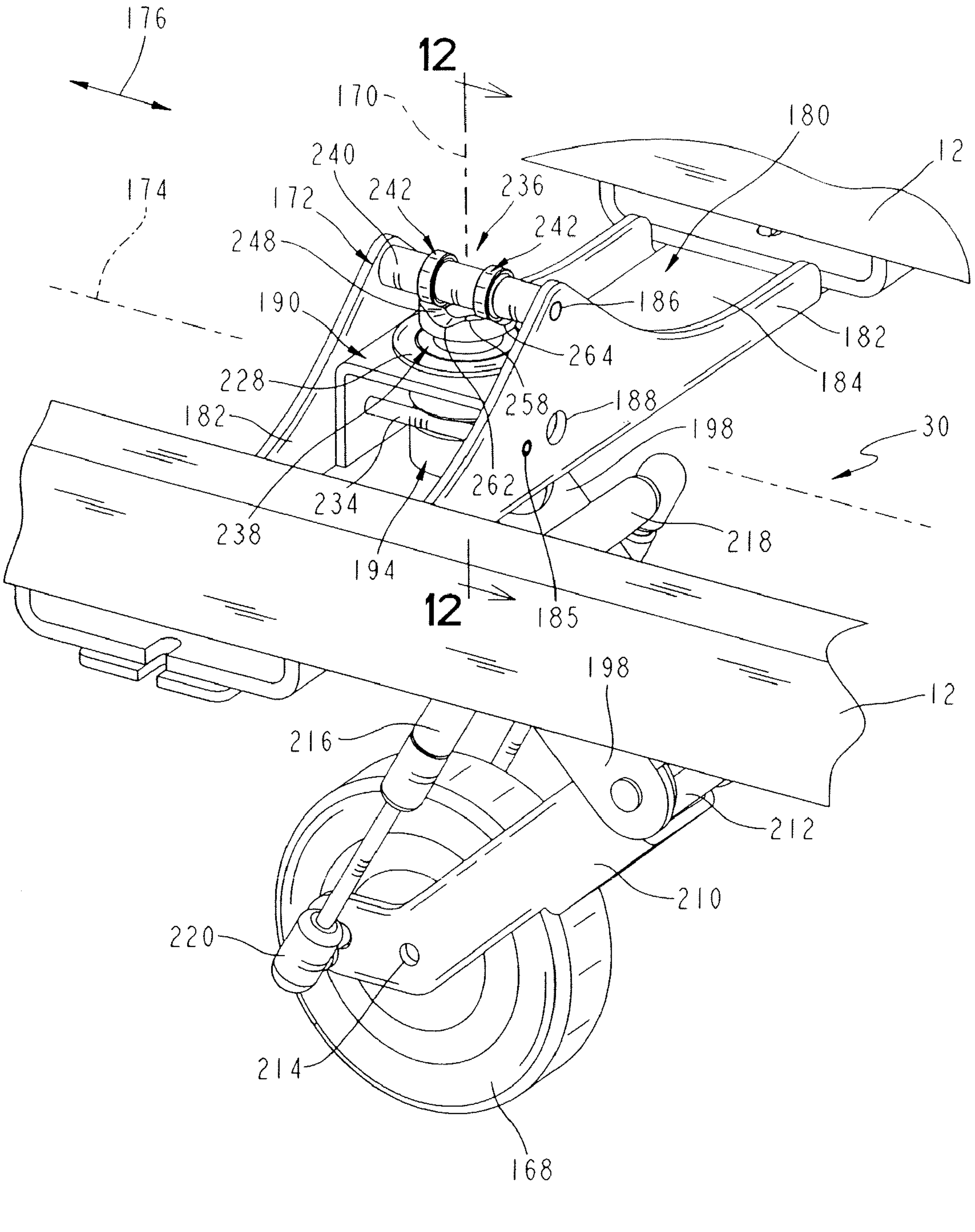
FIG. 9 is a perspective view of a center or fifth wheel assembly showing the fifth wheel assembly coupled to the frame of the patient support of FIG. 1 and a wheel of the patient support facing in a direction parallel with the longitudinal axis of the patient support.
Figure 11:
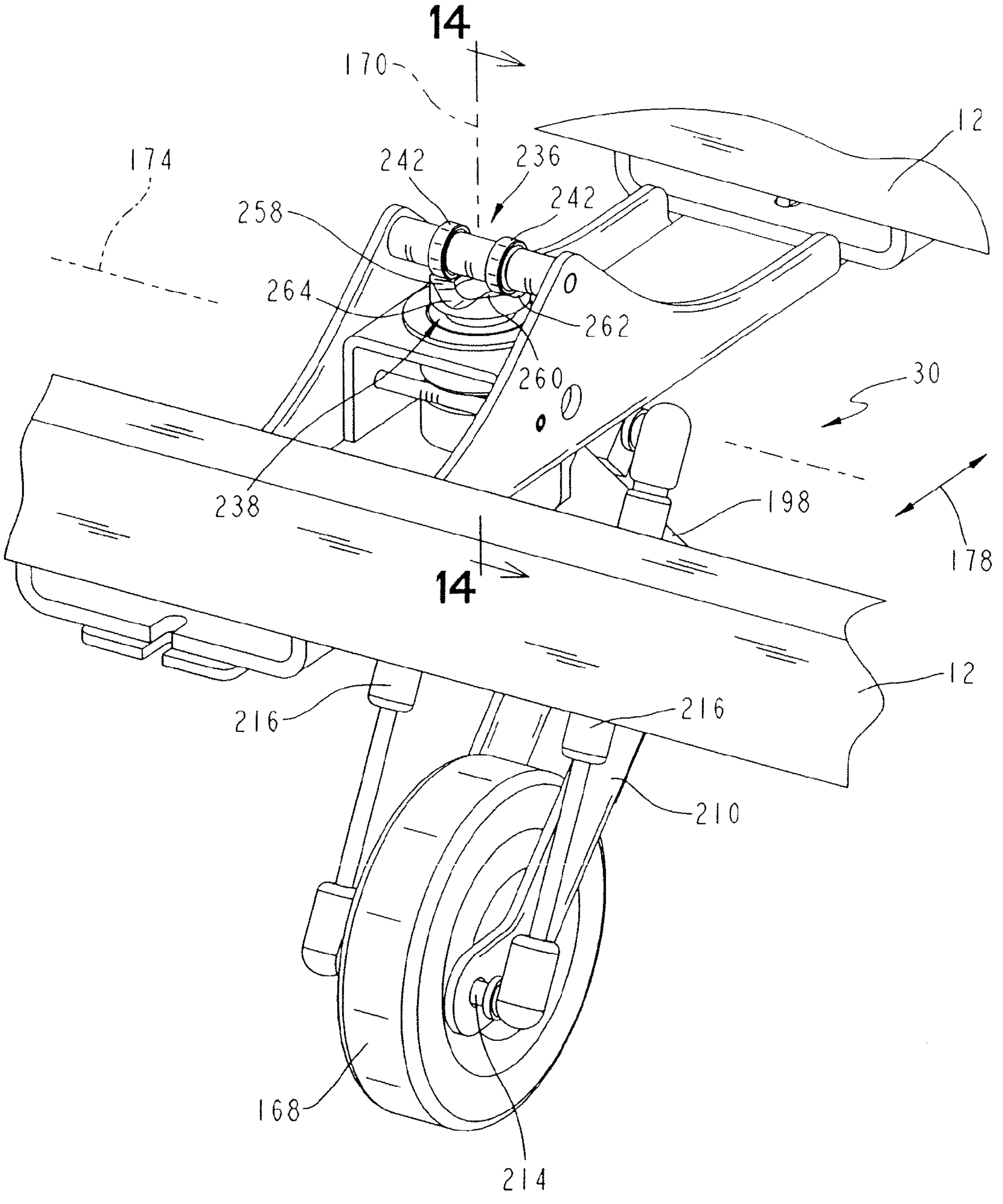
FIG. 11 is a view similar to FIG. 9 showing the wheel facing in a direction that is perpendicular with the longitudinal axis of the patient support.

As shown in FIG. 9, caster wheel 168 is positioned in a first parallel position that is parallel to a longitudinal axis 174 of patient support 10. When in this position, caster wheel 168 is aligned to roll along the floor when patient support 10 is being pushed in direction 176 along longitudinal axis 174 of patient support 10 such as when patient support 10 is being pushed down a hallway. In FIG. 11, caster wheel 168 is positioned in a second perpendicular position that is perpendicular to longitudinal axis 174 of patient support 10. When in this position, caster wheel 168 is aligned to roll along the floor when patient support 10 is being pushed in direction 178 perpendicular to longitudinal axis 174 such as when patient support is being positioned in a room.

Positioning fifth wheel 168 parallel to or perpendicular to longitudinal axis 174 of patient support 10 allows a caregiver to easily steer patient support 10 during movement of patient support 10 in a hallway or in a patient's room. Another suitable fifth wheel assembly is described in French Patent No. 2783463, titled "Rolling support for medical usage, has wheel held by bracket mounted on support shaft, carried in spring loaded sliding housing, which has lower edge profiled to fit on to roller cam fitted to support shaft," filed Sep. 9, 1998, to Pascal Guguin, the disclosure of which is herein expressly incorporated by reference.

Position holder 172 is configured to permit movement of wheel 168 to either the first parallel position or the second perpendicular position. However, if wheel 168 is positioned between these two positions, position holder 172 urges wheel 168 back toward either the first parallel position or the second perpendicular position. Thus, if wheel 168 is in an intermediate position as shown in FIG. 10, position holder 172 urges wheel 168 either toward the first parallel position shown in FIG. 9 or toward the second perpendicular position shown in FIG. 11.

Fifth wheel assembly 30 further includes a base 180 coupled to frame 24 as shown in FIG. 9. In the preferred embodiment, base 180 is positioned in the middle of frame 24 as shown in FIG. 1. According to alternative embodiments of the present disclosure, base 180 is placed elsewhere on frame 24 such as under the center of gravity of the patient support and/or patient.

Base 180 is saddle-shaped and includes a pair of side plates 182 and a middle plate 184 extending between side plates 182. Side plates 182 include openings 185, 186, 188. Position holder 172 includes a saddle-shaped base 190 coupled between side plates 182. Base 190 includes opening 192 (one not shown) corresponding to openings 185 of side plates 182 and a bearing-receiving opening 192 as shown in FIG. 15.

Wheel assembly 30 further includes a post or stem 194 positioned to extend through an opening 196 formed in middle plate 184 of base 180. A first upper link 198 is rigidly coupled to stem 194 and a second lower link 210 is pivotably coupled to first upper link 198 by a rod 212. Wheel 168 is rotatably coupled to second lower link 210 by an axle 214.

Wheel assembly 30 includes a pair of gas springs or biasers 216 pivotably coupled to upper link 198 by a first coupler 218 and pivotably coupled to lower link 210 by a second coupler 220. Gas springs 216 urges wheel 168 into contact with the floor surface. Thus, if wheel 168 encounters a pump or depression on the floor, wheel 168 travels up or down and remains in contact with the floor.

Figure 12:
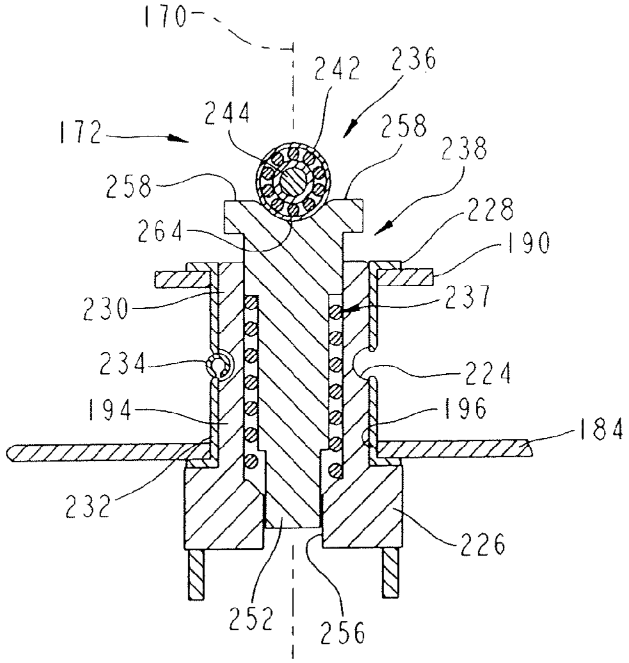
FIG. 12 is a cross-section view taken along line 12-12 of FIG. 9 showing a ball bearing positioned in a first valley of a wheel position holder.
Figure 15:
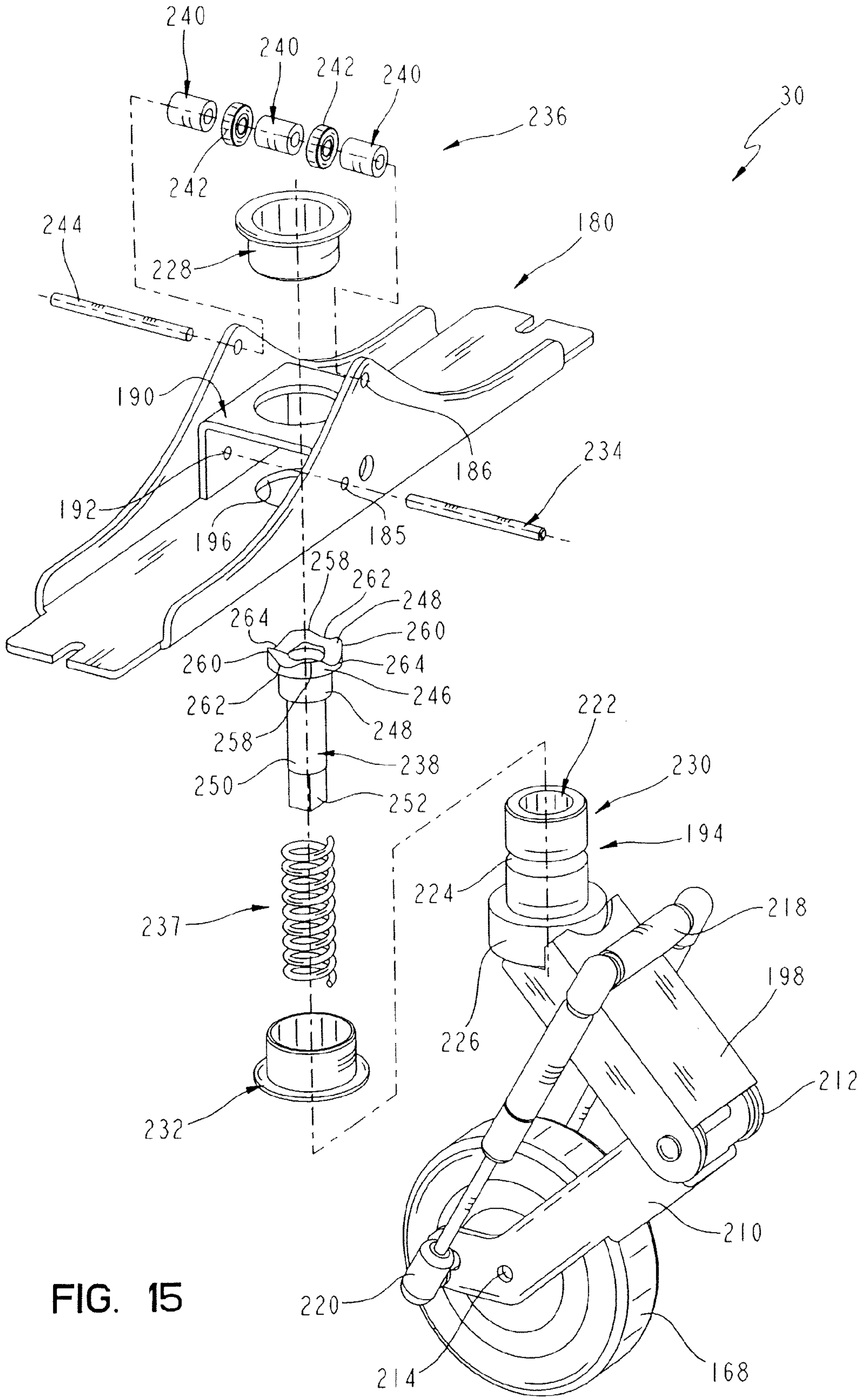
FIG. 15 is an exploded assembly view of the caster wheel assembly.

As shown in FIG. 15, stem 194 includes an upper opening 222, an annular channel 224, and a collar 226. Wheel assembly 30 includes an upper sleeve or bearing 228 positioned between base 190 and an upper portion 230 of stem 194 and a lower sleeve or bearing 232 positioned between collar 226 and middle plate 184 of base 180 when wheel assembly 30 is fully assembled as shown in FIG. 12. Bearings 228, 232 reduce the friction and wear between stem 194 and bases 190, 180. To retain stem 194 in bases 190, 180, a pin 234 is inserted through openings 185 of base 180 and corresponding openings 192 of base 190 and passes through a portion of channel 224 of stem 194 as shown in FIGS. 9-12. Because channel 224 is annular, stem 194 can rotate while pin 234 is positioned in channel 224.

As shown in FIG. 15, position holder 172 includes a first cam member 236 coupled to side plates 182, a second cam member 238 positioned to interact with first cam member 236, and biaser or spring 237 positioned to urge second cam member 238 toward first cam member 236. First and second cam members 236, 238 cooperate to urge wheel 168 to either the first parallel or second perpendicular positions.

Figure 13:
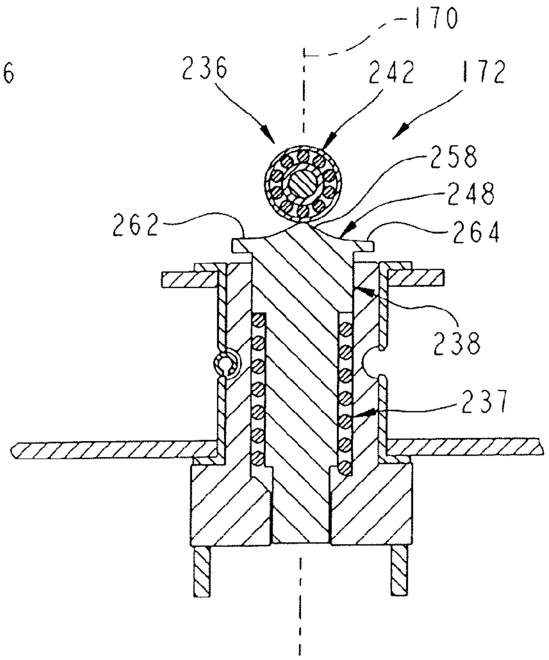
FIG. 13 is a cross-sectional view taken along line 13-13 of FIG. 10 showing the ball bearing positioned on a first peak of the wheel position holder.
Figure 14:
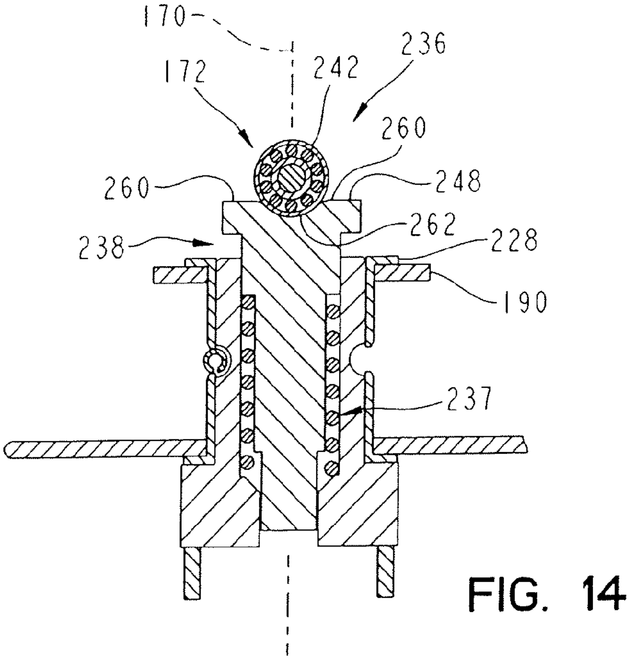
FIG. 14 is a cross-sectional view taken along line 14-14 of FIG. 11 showing the ball bearing positioned in a second valley of the wheel position holder.

First cam member 236 includes three spacers 240, two ball bearings 242, and a pin 244. Pin 244 is inserted through opening 186 in side plates 182, spacers 240, and ball bearings 242 to support bearings 242 above second cam member 238 as shown in FIGS. 12-14.

Second cam member 238 includes an upper collar 246 having a sinusoidal cam surface 248, a shoulder 248, a shaft 250, and a square keyed portion 252. When fifth wheel assembly 30 is fully assembled, second cam member 238 is positioned in opening 222 of stem 194 and spring 237 as shown in FIGS. 12-14. Lower end 256 of passage 254 has a square profile that complements keyed portion 252 of second cam member 238. Thus, when wheel 168 and stem 194 rotate, second cam member 238 also rotates. However, second cam member 238 can move up and down in passage 254. Shoulder 248 of second cam member 238 is positioned over spring 237 so that second cam 238 is urged upwardly toward first cam member 236.

In the preferred embodiment, cam surface 248 on the upper end of second cam member 238 has a smooth sinusoidal profile that includes a pair of first peaks 258, a pair of second peaks 260, a pair of first valleys 262, and a pair of second valleys 264. Each respective first peak 258, second peak, 260, first valley 262, and second valley 264 is positioned opposite one another about vertical axis 170 of stem 194. Peaks 258, 260 separate valleys 262, 264 so that valleys 262, 264 are spaced approximately 90° apart on cam surface 248 about axis 266.

Valleys 264 are slightly deeper than valleys 262 in the preferred embodiment. According to alternative embodiments of the present disclosure, the cam surface has fewer or more valleys and peaks, peaks with sharp contours or other contours to provide other suitable profiles.

When fifth wheel assembly 30 is assembled, cam surface 248 is pushed upward into contact with ball bearings 242 so that ball bearings 242 "roll over" cam surface 248. Referring now to FIGS. 9-11, wheel 168 can rotate 360° relative to base 180. However, because of cam surface 248, wheel 168 is urged toward one of four positions either parallel or perpendicular to the longitudinal axis of patient support 10.

When wheel 168 is in one of the four positions, ball bears 242 are positioned in either first valleys 262 or second valleys 264 as shown in FIGS. 12 and 14. When wheel 168 is rotated, ball bearings 242 roll up either peaks 258 or peaks 260 and second cam member 238 is pushed down against the bias of spring 237. When positioned on peaks 258, 260, the normal force between ball bearings 242 and cam surface 248 have both axial and radial components. The radial components urge second cam member 238 toward the nearest valley 262, 264. Thus, when wheel 168 is not positioned in one of the four positions, it is urged back toward the nearest of the four positions. When ball bearings 242 ride over one of peaks 258, 260, they are urged toward the nearest valley 262, 264.

Because valleys 264 are deeper than valleys 262, the radial components of the normal forces are greater. Thus, it is easier to move from the second perpendicular position to the first parallel position and vice versa. Because cam surface 238 is smooth, the transition of wheel 168 from one position to position is also smooth.

To move wheel 168 from the first parallel position to the second perpendicular position, a caregiver pushes on patient support 10 in a transverse direction. This force creates torque on wheel 168 and urges ball bearings 242 to ride up one of peaks 258, 260. Once wheel 168 has rotated approximately 45°, ball bearings 242 are positioned on top of peaks 258, 260. With further movement of wheel 168 about axis 166, ball bearings 242 and wheels 168 are urged toward the second perpendicular position.

To move wheel 168 from the second perpendicular position to the first parallel position, a caregiver pushes on patient support 10 in a longitudinal direction. This force creates torque on wheel 168 and urges ball bearings 242 to ride up one of peaks 258, 260. Once wheel 168 has rotated approximately 45°, ball bearings 242 are positioned on top of peaks 258, 260. With further movement of wheel 168 about axis 166, ball bearings 242 and wheels 168 are urged toward the first parallel position.

Fifth wheel 168 is rotated between being parallel to the longitudinal axis of patient support 10 and perpendicular to the longitudinal axis of patient support 10 and vice versa by a caregiver gently pushing patient support 10 from either one of the head or foot end or along one of the longitudinal sides of patient support 10.

Preferably, instructions for the assembly, installation, and/or use of patient support 10 are provided with patient support 10 or otherwise communicated to permit a person or machine to assemble, install and/or use patient support 10. Such instructions may include a description of any or all portions of patient support 10 and/or any or all of the above-described assembly, installation, and use of patient support 10 or components of patient support 10. The instructions may be provided on separate papers and/or on the packaging in which patient support 10 is sold or shipped. These instructions may also be provided over the Internet or other communication system. Furthermore, the instructions may be embodied as text, pictures, audio, video, or any other medium or method of communicating instructions known to those of ordinary skill in the art.

The features of the present disclosure have been described with respect to beds, but they can also be used on examination tables, stretchers, gurneys, wheel chairs, chair beds, or any other patient support devices for supporting a person during rest, treatment, or recuperation.

Unless otherwise stated herein, the figures are proportional. Although the present invention has been described in detail with reference to preferred embodiments, variations and modifications exist within the scope and spirit of the present invention as described and defined in the following claims.

The invention claimed is:

1. A patient support adapted to be connected to an external power source, the patient support comprising a bedframe supported on a floor, a plurality of wheels coupled to the bedframe, a brake configured to prevent the bedframe from moving on the floor, the brake being moveable between a braked position and an unbraked position, and a controller configured to activate an alarm when the brake is moved to the unbraked position when the patient support is connected to the external power source, wherein the alarm comprises an audible alarm.

2. The patient support of claim 1, wherein the plurality of wheels comprise casters in contact with the floor.

3. The patient support of claim 1, wherein the brake includes a lever supported by the bedframe and moveable between the braked and unbraked positions by a user's foot.

4. The patient support of claim 1, wherein the audible alarm is included as part of a control panel coupled to the bedframe.

5. The patient support of claim 1, wherein the alarm further comprises an indicator light.

6. The patient support of claim 5, wherein the indicator light flashes to provide a warning not to move the patient support until disconnected from the external power source.

7. The patient support of claim 5, wherein the indicator light is included as part of a control panel coupled to the bedframe.

8. The patient support of claim 1, wherein the brake includes an electrical contact configured to send a signal to the controller when the brake is moved from the unbraked position to the braked position.

9. The patient support of claim 1, further comprising a battery enable switch that allows a caregiver to operate electrically controlled functions of the patient support using battery power when the patient support is disconnected from the external power source.

10. The patient support of claim 9, wherein the bedframe includes a siderail and the battery enable switch is mounted to the siderail.

11. The patient support of claim 9, further comprising a pendant controller and the battery enable switch is mounted to the pendant controller.

12. A patient support adapted to be connected to an external power source, the patient support comprising a bedframe supported on a floor, a plurality of wheels coupled to the bedframe, a brake configured to prevent the bedframe from moving on the floor, the brake being moveable between a braked position and an unbraked position, and a controller configured to activate an alarm when the brake is moved to the unbraked position when the patient support is connected to the external power source, and a battery enable switch that allows a caregiver to operate electrically controlled functions of the patient support using battery power when the patient support is disconnected from the external power source, wherein if the patient support is disconnected from external power and the battery enable switch has not been used for a threshold time period, the patient support is placed in a sleep mode.

13. The patient support of claim 12, wherein the threshold time period is about 20 minutes.

14. The patient support of claim 12, wherein during sleep mode, the electrically operable functions of the patient support are disabled.

15. A patient support adapted to be connected to an external power source, the patient support comprising a bedframe supported on a floor, a plurality of wheels coupled to the bedframe, a brake configured to prevent the bedframe from moving on the floor, the brake being moveable between a braked position and an unbraked position, and a controller configured to activate an alarm when the brake is moved to the unbraked position when the patient support is connected to the external power source, wherein the brake includes a lever supported by the bedframe and moveable between the braked and unbraked positions by a user's foot.

16. A patient support adapted to be connected to an external power source, the patient support comprising a bedframe supported on a floor, a plurality of wheels coupled to the bedframe, a brake configured to prevent the bedframe from moving on the floor, the brake being moveable between a braked position and an unbraked position, and a controller configured to activate an alarm when the brake is moved to the unbraked position when the patient support is connected to the external power source, wherein the alarm comprises an indicator light, wherein the indicator light flashes to provide a warning not to move the patient support until disconnected from the external power source.

17. The patient support of claim 16, wherein the indicator light is included as part of a control panel coupled to the bedframe.

18. A patient support adapted to be connected to an external power source, the patient support comprising a bedframe supported on a floor, a plurality of wheels coupled to the bedframe, a brake configured to prevent the bedframe from moving on the floor, the brake being moveable between a braked position and an unbraked position, a controller configured to activate an alarm when the brake is moved to the unbraked position when the patient support is connected to the external power source, and a battery enable switch that allows a caregiver to operate electrically controlled functions of the patient support using battery power when the patient support is disconnected from the external power source, wherein the bedframe includes a siderail and the battery enable switch is mounted to the siderail.

19. A patient support adapted to be connected to an external power source, the patient support comprising a bedframe supported on a floor, a plurality of wheels coupled to the bedframe, a brake configured to prevent the bedframe from moving on the floor, the brake being moveable between a braked position and an unbraked position, a controller configured to activate an alarm when the brake is moved to the unbraked position when the patient support is connected to the external power source a battery enable switch that allows a caregiver to operate electrically controlled functions of the patient support using battery power when the patient support is disconnected from the external power source, and a pendant controller and the battery enable switch is mounted to the pendant controller.

* * * * *